(No Model.)
S. Z. DE FERRANTI.
DISTRIBUTION OF ELECTRICAL ENERGY.
No. 409,566. Patented Aug. 20, 1889.
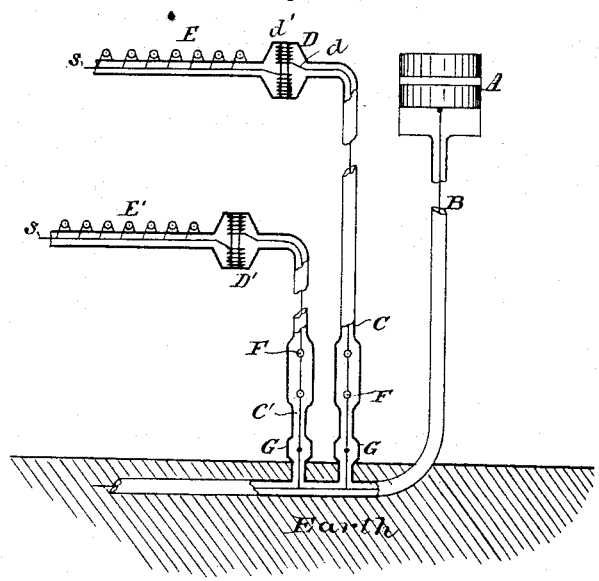

UNITED STATES PATENT OFFICE.

SEBASTIAN ZIANI DE FERRANTI, OF HAMPSTEAD, COUNTY OF MIDDLESEX, ENGLAND.

DISTRIBUTION OF ELECTRICAL ENERGY.

SPECIFICATION forming part of Letters Patent No. 409,566, dated August 20, 1889.

Application filed February 19, 1889. Serial No. 300,458. (No model.) Patented in England December 11, 1885, No. 15,251; in France December 9, 1886, No. 180,176; in Belgium January 8, 1887, No. 75,875, and in Italy March 31, 1887, No. 21,119.

*To all whom it may concern:*

Be it known that I, SEBASTIAN ZIANI DE FERRANTI, electrician, a subject of the Queen of Great Britain, residing at 120 Fellows Road, Hampstead, in the county of Middlesex, England, have invented certain new and useful Improvements in the Distribution of Electrical Energy, (for part of which invention I have received Letters Patent in Great Britain, No. 15,251, dated December 11, 1885; in France, No. 180,176, dated December 9, 1886; in Belgium, No. 75,875, dated January 8, 1887, and in Italy, No. 21,119, dated March 31, 1887,) of which the following is a specification.

The object of my invention is to enable towns or other places to be supplied with perfect safety with electrical energy from dynamo-electric machines or generators at a distance from them. To effect this, I use at the generating-station an alternating-current dynamo-electric machine wound to give a high electro-motive force—say ten thousand volts. The current I convey to the distant place or town by concentric conductors insulated from one another, the inner conductor being coupled to one pole of the dynamo and the outer conductor to the other pole of the dynamo (preferably to the framing of the dynamo, which is made to form the second pole) and to earth. In this way perfect safety is obtained, as the inner conductor is entirely incased within the outer one, and the outer one is always approximately of the same potential as the earth. It can therefore be handled with perfect safety. All parts of the framing of the dynamo can also, for the same reason, be safely handled. The revolving armature alone is of much higher potential than the earth, and consequently dangerous; but as the armature is not only revolving, but is also within the framing of the machine, no one could handle or come in contact with it. At the town or place where the current is to be used the tension of the current is reduced by converters to such an extent that it can be distributed with safety. The casing in which each converter is contained I make to form part of the outer conductor. The requisite fuses and switches on the branches leading to the converters I also similarly inclose within the outer conductor. Thus the high-tension main is at all points completely inclosed, and perfect safety is obtained.

Figure 1 of the drawings annexed is a longitudinal section of part of two concentric conductors insulated from one another. Fig. 2 is a diagram view of the system.

A is a dynamo; B, concentric conductors, one within the other, the inner one coupled to one pole, the outer one to the frame of the dynamo, which forms the other pole.

C C' are branches leading from the concentric conductors to converters D D', which, as shown, are completely inclosed in a casing. One end of the primary of each converter is coupled to the inner high-tension main, as at d, and the other to the casing, as at d'. One end of the secondary coil is also connected directly with the casing and the other to a wire s, between which and the casing the lamps or translating devices are connected.

E E' are lamp-circuits fed by the converters.

F F are fuses in the branches to the converters, and G G are switches for switching current onto or off from the converters.

What I claim is—

1. The combination of a dynamo-electric machine, concentric conductors insulated from one another leading therefrom, the inner conductor coupled to one terminal of the dynamo, the outer conductor to the other terminal and to earth.

2. The combination of a dynamo-electric machine, concentric conductors insulated from one another leading therefrom, the inner conductor coupled to one terminal of the dynamo, the outer conductor coupled to earth and to the frame of the dynamo, which forms the other terminal.

3. The combination of a dynamo-electric machine, concentric conductors insulated from one another leading therefrom, the inner conductor coupled to one terminal of the dynamo, the outer conductor to the other terminal and to earth, and a converter with one pole of its primary coupled to the inner conductor and the other pole to the outer conductor and to earth.

4. The combination of a dynamo-electric machine, concentric conductors insulated from one another leading therefrom, and an electrical appliance—such, for instance, as a fuse, switch, or converter—inclosed within the outer return-conductor.

5. The combination of a dynamo-electric machine, concentric conductors insulated from one another leading therefrom, the outer conductor being connected with the earth and kept approximately at the same potential as the earth, and an electrical appliance—such, for instance, as a fuse, switch, or converter—used in connection with the inner conductor inclosed within the outer one.

6. The combination of a dynamo-electric machine, concentric conductors insulated from one another leading therefrom, branch concentric conductors leading from the first conductors, switches and fuses on the inner high-tension conductor of the branches inclosed in casings which form part of the outer conductor, and converters similarly inclosed and with their primary coupled at one end to the high-tension conductor and at the other to the casing.

SEBASTIAN ZIANI DE FERRANTI.

Witnesses:
GEO. J. B. FRANKLIN,
HERBERT E. DALE,
*Both of 17 Gracechurch Street, London, E.C.*